US012341336B2

(12) United States Patent
Ruffo et al.

(10) Patent No.: US 12,341,336 B2
(45) Date of Patent: Jun. 24, 2025

(54) RELIABILITY IMPROVEMENT FOR SWITCH CONTROLLED MOTOR OPERATED DEVICES

(71) Applicant: FLUID HANDLING LLC., Morton Grove, IL (US)

(72) Inventors: Matthew J. Ruffo, Geneva, NY (US); Paul J. Ruzicka, Auburn, NY (US)

(73) Assignee: FLUID HANDLING LLC, Morton Grove, IL (US)

( * ) Notice: Subject to any disclaimer, the term of this patent is extended or adjusted under 35 U.S.C. 154(b) by 369 days.

(21) Appl. No.: 15/133,750

(22) Filed: Apr. 20, 2016

(65) Prior Publication Data

US 2016/0315463 A1  Oct. 27, 2016

Related U.S. Application Data

(60) Provisional application No. 62/149,966, filed on Apr. 20, 2015.

(51) Int. Cl.
*H02H 9/00* (2006.01)
*H02P 1/26* (2006.01)
*H02P 1/42* (2006.01)

(52) U.S. Cl.
CPC .............. *H02H 9/005* (2013.01); *H02P 1/26* (2013.01); *H02P 1/42* (2013.01)

(58) Field of Classification Search
CPC .. A47C 1/06; B66B 1/08; B66C 13/54; B66C 2700/085; G05D 3/128

(Continued)

(56) References Cited

U.S. PATENT DOCUMENTS 3,036,255 A * 5/1962 Lewus .................... H02P 1/265
                                              318/768
4,152,634 A   5/1979 Penrod
(Continued)

FOREIGN PATENT DOCUMENTS

EP          2450927          5/2012

OTHER PUBLICATIONS

RMCybermetics Ltd., "Driving Inductive Loads", Vendor's website, https://rmcybernetics.com/product-guides/driving-inductive-loads; Jun. 24, 2011; whole document (Year: 2011).*

(Continued)

*Primary Examiner* — Eduardo Colon Santana
*Assistant Examiner* — Bradley Brown
(74) *Attorney, Agent, or Firm* — William J. Barber; WARE FRESSOLA MAGUIRE & BARBER LLP

(57) ABSTRACT

A motor control circuit is provided for connecting or disconnecting an AC voltage to an AC motor, having a switch having two switch contacts, configured to respond to a process variable and move between open and closed switch contact positions to connect or disconnect the AC voltage to the AC motor; and a snubber circuit arranged across the switch contacts in parallel with the AC motor, and configured to respond to motor inductance when the switch is moved between the open and closed switch contact positions, and provide arc suppression in the switch by dissipating energy stored in the motor inductance. The snubber circuit may include a network having a resistor connected in series with a capacitor, or a metal oxide varistor, or a transient voltage suppressor.

26 Claims, 3 Drawing Sheets

1 = AC Voltage Source
2 = Double Pole Single Throw Switch
    2.1 = Power side pole 1
    2.2 = Power side pole 2
    2.3 = Motor side pole 1
    2.4 = Motor side pole 2
3 = Motor
4 = RC Snubber Circuit
    4.1 = Snubber Resistor
    4.2 = Snubber Capacitor : RC Snubber

(58) Field of Classification Search
USPC .................................................. 318/519
See application file for complete search history.

(56) References Cited

U.S. PATENT DOCUMENTS

| | | | |
|---|---|---|---|
| 4,358,808 | A | 11/1982 | Praeg |
| 4,422,029 | A * | 12/1983 | Demers .................. H02P 23/24 |
| | | | 318/753 |
| 4,697,219 | A | 9/1987 | Mitsuoka |
| 5,383,108 | A | 1/1995 | Okayama |
| 5,463,252 | A | 10/1995 | Jones et al. |
| 5,581,137 | A | 12/1996 | Lundquist et al. |
| 6,181,125 | B1 | 1/2001 | Li et al. |
| 6,621,668 | B1 | 9/2003 | Sare |
| 6,885,535 | B2 | 4/2005 | Hummert et al. |
| 7,075,764 | B2 | 7/2006 | Wahlroos et al. |
| 7,117,105 | B2 | 10/2006 | Premerlani et al. |
| 7,145,758 | B2 | 12/2006 | King et al. |
| 7,385,791 | B2 | 6/2008 | Ness |
| 7,505,236 | B2 | 3/2009 | Kobielski |
| 7,542,250 | B2 | 6/2009 | Premerlani et al. |
| 7,602,157 | B2 * | 10/2009 | Babcock ................ H02P 7/281 |
| | | | 318/400.22 |
| 7,612,971 | B2 | 11/2009 | Premerlani et al. |
| 7,643,256 | B2 | 1/2010 | Wright et al. |
| 7,876,538 | B2 | 1/2011 | Wright et al. |
| 8,050,000 | B2 | 11/2011 | Wright et al. |
| 8,054,589 | B2 | 11/2011 | Gowda et al. |
| 8,422,178 | B2 | 4/2013 | Pfingsten et al. |
| 8,619,395 | B2 | 12/2013 | Henke |
| 8,680,872 | B2 | 3/2014 | Nowicki et al. |
| 8,822,862 | B2 | 9/2014 | Cyuzawa |
| 2003/0155875 | A1 * | 8/2003 | Weinmann ................ H02P 5/74 |
| | | | 318/110 |
| 2007/0146958 | A1 * | 6/2007 | Babcock ................ H02P 7/281 |
| | | | 361/160 |
| 2008/0308254 | A1 * | 12/2008 | Premerlani .............. F24F 11/30 |
| | | | 165/48.1 |
| 2008/0310057 | A1 | 12/2008 | Kumfer et al. |
| 2009/0167225 | A1 * | 7/2009 | Dooley ................ H02P 25/024 |
| | | | 318/400.25 |
| 2012/0038310 | A1 * | 2/2012 | Anand ...................... H02P 1/26 |
| | | | 318/778 |
| 2012/0086373 | A1 * | 4/2012 | Kudanowski ......... H02P 29/032 |
| | | | 318/400.22 |
| 2012/0153963 | A1 * | 6/2012 | Tyler .................. G01R 31/3277 |
| | | | 324/537 |
| 2014/0078623 | A1 * | 3/2014 | Henke .................... H01H 9/542 |
| | | | 361/13 |
| 2014/0091061 | A1 | 4/2014 | Henke |
| 2014/0368143 | A1 * | 12/2014 | Breitzmann .............. H02P 3/22 |
| | | | 318/400.22 |

OTHER PUBLICATIONS

Thomas Platzer; "Snubber circuits for inductive loads", Hiquel Gmbh; HIQUEL_Snubber_AppNote_DE_0100.doc; Jan. 29, 2010; Revision 0100; pp. 1-4 (Year: 2010).*

RMCybernetics Ltd., "Driving Inductive Loads", Vendor's website, https://rmcybermetics.com/product-guides/driving-inductive-loads; Jun. 24, 2011; whole document (Year: 2011).*

Detmers, M. and Blauvelt, T., "Variable DC voltage wall outlet for the DC House Project," California Polytechnic State University, Electrical Engineering Department, San Luis Obispo, Jun. 2011, 65 pages.

Daniel J. Rogers and Tim C. Green, "An Active-Shunt Diverter for On-load Tap Changers", IEEE Transactions on Power Delivery, vol. 28, No. 2, Apr. 2013, pp. 649-657.

David D. Shipp, Thomas J. Dionise, Visuth Lorch and William G. MacFarlane, "Vacuum Circuit Breaker Transients During Switching of an LMF Transformer", IEEE Transactions on Industry Applications, vol. 48, No. 1, Jan./Feb. 2012, pp. 37-44.

R. W. Warren, "The Early Counterpulse Technique Applied to Vacuum Interrupters", Los Alamos Scientific Laboratory; University of California, Los Alamos, Nov. 1979, 22 pages.

Wolfhard Merz and Monty Grimes,"Fast Opening Switch Approach for High-Voltage Vacuum Tube Protection Application", 2012, 4 pages.

Wikipedia, "Nonlinear element", 1 page.
Wikipedia, "Linear element", 1 page.
Wikipedia, "Transient-voltage-suppression diode", 3 pages.
Wikipedia, "Varistor", 6 pages.

Thomas Platzer; "Snubber circuits for inductive loads"; Hiquel GmbH; HIQUEL_Snubber_AppNote_DE_0100.doc; Jan. 29, 2010; Revision 0100; pp. 1-4.

Leviton Manufacturing Co., Inc., "Motor Starter and Disconnect Switches—Product Line Bulletin", Vendor's website, B-970B/D4-7.5M sa (2004), https://stevenengineering.com/tech_support/PDFS/74msds.pdf; May 30, 2005; pp. 1-10.

RMCybernetics Ltd., "Driving Inductive Loads", Vendor's website, https://rmcybernetics.com/product-guides/driving-inductive-loads; Jun. 24, 2011; whole document.

Fisher-Rosemount Systems, Inc., "Installing Your DeltaV™ Digital Automation System", Vendor's website, D800001X192, https://dl-manual.com/doc/hardware-manual-mz75y0jx68o7, Dec. 2008 (Dec. 2008); pp. 1-588.

Blue Point Engineering LLC, "R-C Snubber Noise and Arc Suppressor"; Vendor's website, http://www.bpesolutions.com/bpemanuals/Snubber.pdf; Aug. 29, 2013; whole document.

Cart, O., "How reduce spikes when switching AC inductive load", electronics discussion forum, https://www.edaboard.com/threads/how-reduce-spikes-when-switching-ac-inductive-load.333952/, Mar. 17, 2015 (Mar. 17, 2015); whole document.

Littelfuse, Inc., Transient Suppression Devices and Principles—Application Note AN9768, Manufacturer's website, https://m.littelfuse.com/~/media/electronics_technical/application_notes/varistors/littelfuse_transient_suppression_devices_and_principles_application_note.pdf, Jan. 1998 (Jan. 1998); whole document.

Okaya Electric Industries Co., Ltd., "Noise Suppressing Components", manufacturer's catalogue, Mar. 29, 2015 (Mar. 29, 2015), https://web.archive.org/web/20150329164221/https://www.cdiweb.com/Datasheets/okay a/NoiseSurgeCatalog2014.pdfhttps://web.archive.org/web/20150329164221/https://www .cdiweb.com/Datasheets/okaya/NoiseSurgeCatalog2014.pdf; whole document.

* cited by examiner

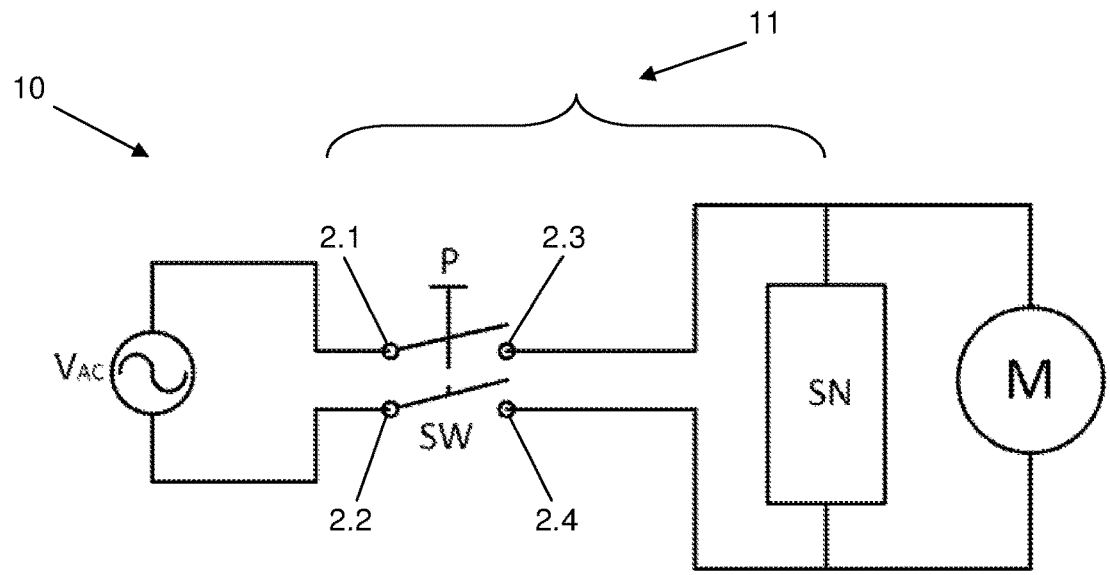
Figure 1
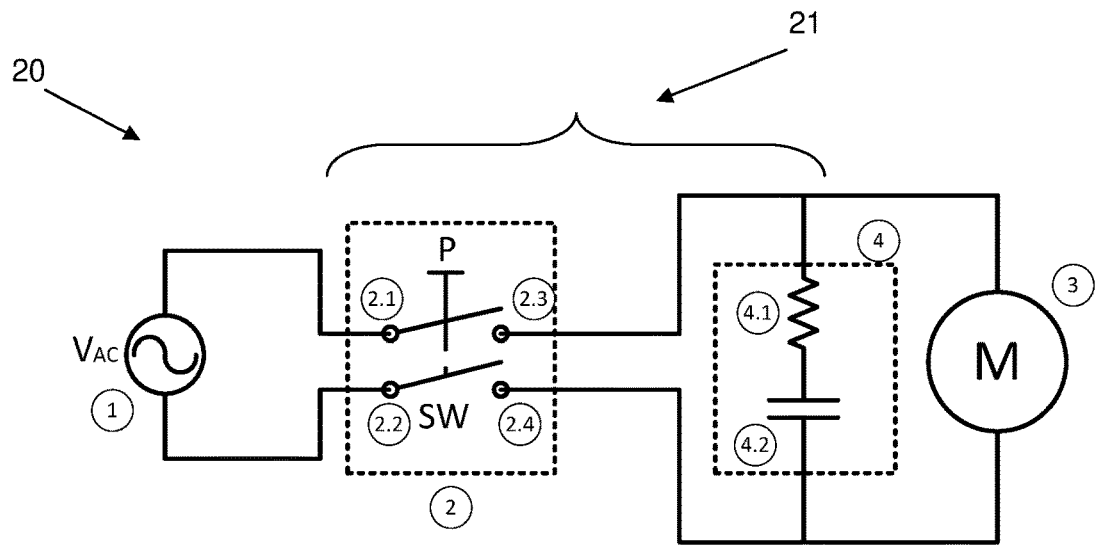
1 = AC Voltage Source
2 = Double Pole Single Throw Switch
    2.1 = Power side pole 1
    2.2 = Power side pole 2
    2.3 = Motor side pole 1
    2.4 = Motor side pole 2
3 = Motor
4 = RC Snubber Circuit
    4.1 = Snubber Resistor
    4.2 = Snubber Capacitor
Figure 2A: RC Snubber

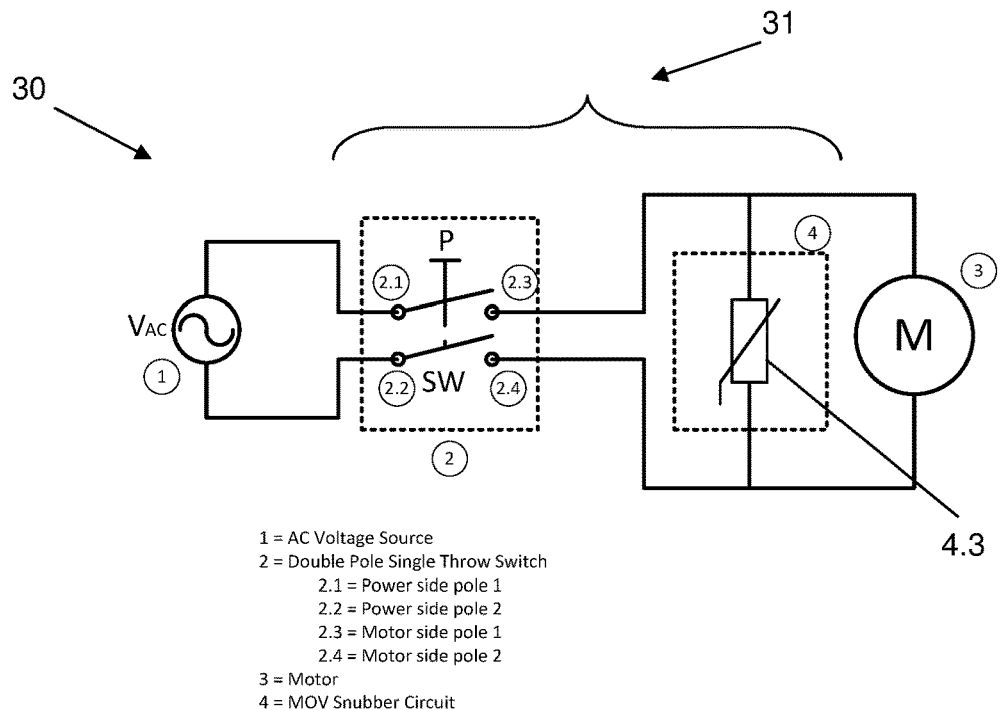
Figure 2B: MOV Snubber
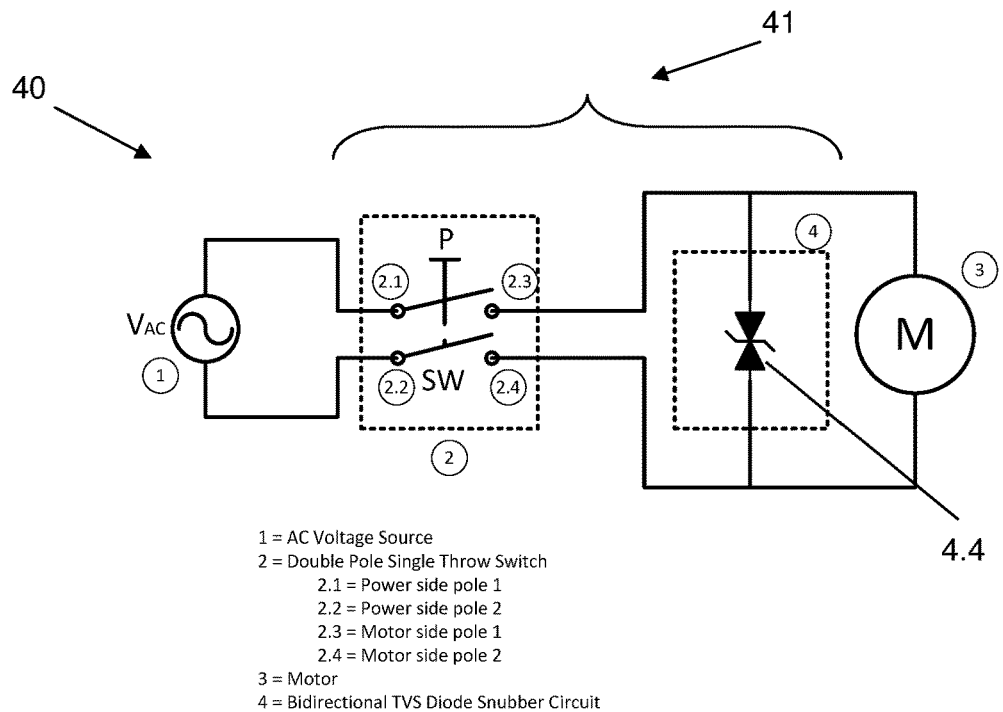
Figure 2C: TVS Snubber

RELIABILITY IMPROVEMENT FOR SWITCH CONTROLLED MOTOR OPERATED DEVICES

CROSS-REFERENCE TO RELATED APPLICATION

This application claims benefit to provisional patent application Ser. No. 62/149,966, filed 20 Apr. 2015, which is hereby incorporated by reference in its entirety.

BACKGROUND OF THE INVENTION

1. Field of the Invention

The present invention relates to a circuit for turning a motor on/off; and more particularly relates to a circuit for turning a motor on/off having a snubber circuit to suppress arcing and improve the life of the circuit.

2. Brief Description of Related Art

In the prior art, many known motor operated devices or products are controlled by switches such as pumps, fans and compressors. The switch may be internal or external to the device and can be controlled by a process parameter or variable, such as fluid level, pressure, flow, temperature or any other process variable. Some of the shortcomings of these known devices include: The switches that control motor operated devices can be damaged by arcing when the motor is turned on or off. Arcing can significantly reduce the life of the product. The arcing and the amount of energy of the arc is a result of the inductance in the motor control circuit. In effect, existing techniques do not to dissipate the energy of the arc across the switch, so the switch has a shorter life.

In view of this, there is a need for a better way to suppress arcing in such motor operated devices or products.

SUMMARY OF THE INVENTION

The present invention provides a solution to the aforementioned problem in the art to reduce the damage to a switch caused by arcing, e.g., by providing a discharge path for the energy that produces the arc. Reducing the damage to the switch due to arcing will increase the life of the switch. This discharge path can be implemented by placing a discharge network in parallel with the motor windings of the motor. Various electrical components can be used to create the discharge path. Existing techniques do not employ or use a discharge path to dissipate the energy of the arc, so the switch has a shorter life.

By way of example, the present invention may include, or take the form of, a motor control circuit for connecting or disconnecting a voltage to a motor, featuring:
  a switch having at least one contact, configured to respond to a process variable and move between at least one open and closed switch contact position to connect or disconnect the voltage to the motor; and
  a snubber circuit arranged across the switch contacts in parallel with the motor, and configured to respond to motor inductance when the switch is moved between the open and closed switch contact positions, and provide arc suppression in the switch by dissipating energy stored in the motor inductance.

According to some embodiment of the present invention, the apparatus may also include one or more of the following features:

The snubber circuit may include a network having at least one RC combination connected in parallel with the motor. By way of example, the at least one RC combination may include a network having a resistor connected in series with a capacitor, or having a metal oxide varistor, or having a transient voltage suppressor.

The switch may include two switch contacts arranged in parallel across the motor, configured to respond to the process variable and move between two open and closed switch contact positions to connect or disconnect the voltage to the motor, e.g., including to connect or disconnect AC voltage to AC motor.

According to some embodiments, the motor may include a multiphase AC motor, e.g., such as a 3-phase AC motor;
  the switch may include three switch contacts, configured to respond to the process variable and move between three open and closed switch contact positions, e.g., to connect or disconnect three AC voltages to the 3-phase AC motor; and
  the snubber circuit may include three snubbers, each snubber arranged across a respective pair of switch contacts in parallel with the motor in a respective one of 3-phases, and configured to respond to motor inductance when the switch is moved between the three open and closed switch contact positions, and provide arc suppression in the switch by dissipating energy stored in the motor inductance.

According to some embodiment, the snubber can be applied in AC or DC applications, e.g., consistent with that set forth herein.

The switch may be arranged in series with the voltage and the motor, configured to respond to the process variable and move between open and closed switch contact positions to connect or disconnect the voltage to the motor.

The switch may include two switch contacts arranged in parallel.

By way of example, the apparatus may takes the form of a motor control circuit for connecting or disconnecting an AC voltage to an AC motor, featuring: a switch having two switch contacts, configured to respond to a process variable and move between open and closed switch contact positions to connect or disconnect the AC voltage to the AC motor; and a snubber circuit arranged across the switch contacts in parallel with the AC motor, and configured to respond to motor inductance when the switch is moved between the open and closed switch contact positions, and provide arc suppression in the switch by dissipating energy stored in the motor inductance. The motor control circuit for connecting or disconnecting the AC voltage to the AC motor may include one or more of the features set forth above.

BRIEF DESCRIPTION OF THE DRAWING

The drawing, which is not necessarily drawn to scale, includes the following Figures:

FIG. 1 shows a diagram of a circuit having a snubber for controlling the operation of a motor, according to some embodiments of the present invention.

FIG. 2A shows the diagram shown in FIG. 1 having a snubber with an RC combination, according to some embodiments of the present invention.

FIG. 2B shows the diagram shown in FIG. 1 having an MOV snubber, according to some embodiments of the present invention.

FIG. 2C shows the diagram shown in FIG. 1 having a TVS snubber, according to some embodiments of the present invention.

DETAILED DESCRIPTION OF THE INVENTION

The Basic Invention

Figure 3:
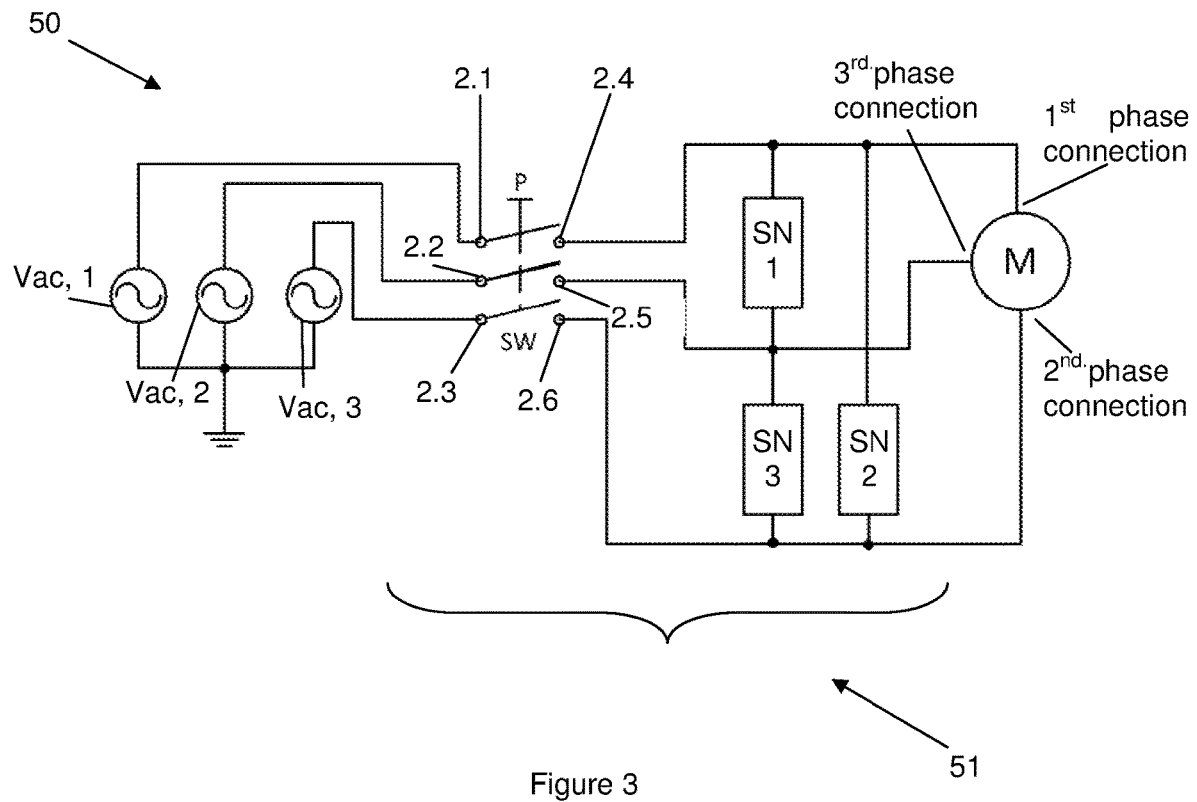
FIG. 3 shows a diagram of a circuit having snubbers for controlling the operation of a 3-phase motor, according to some embodiments of the present invention.

By way of example, the present invention may include, or take the form of, apparatus generally indicated as 10, e.g., having a motor control circuit 11 for connecting or disconnecting a voltage Vac to a motor M, featuring:
- a switch SW having at least one contact 2.1, 2.2, 2.3, 2.4, configured to respond to a process variable P and move between at least one open and closed switch contact position to connect or disconnect the voltage Vac to the motor M; and
- a snubber circuit SN arranged across the switch contacts 2.3, 2.4 in parallel with the motor M, and configured to respond to motor inductance when the switch SW is moved between the open and closed switch contact positions, and provide arc suppression in the switch SW by dissipating energy stored in the motor inductance.

The motor control circuit 11 may take the form of a switch controlled motor operated device, e.g., that includes the following components:
- Vac: Input power source,
- M: Motor,
- SW: Switch having poles or contacts 2.1, 2.2, 2.3, 2.4 for controlling motor (M),
- P: Process variable for controlling switch SW, and
- SN: Arc suppressing Snubber.

In summary, the components operate, as follows:

Vac is an input power source that applies electrical energy to the circuit 10.

M is the motor that applies torque to the load (not shown). The load can be of various types including but not limited to pumps, fans, blowers and compressors.

The SW may take the form of an electromechanical switch that applies electrical energy from the voltage Vac to the motor M.

P is the process variable that is used to control the switch SW. The process variable P can be of various types, including but not limited to, a fluid level, fluid pressure, fluid flow and/or fluid temperature, e.g., which activates the switch SW so as to close or open the motor control circuit 11.

SN is the arc suppressing snubber that is used to dissipate the energy stored in the motor inductance during disconnection of power, and therefore reduces arcing and increases life of the switch. When the switch SW closes (power applied to the motor M), there can be some contact bounce. Contact bounce occurs when the moving switch contact (e.g., like contacts 2.3 or 2.4) mechanically bounces off of the stationary contact (e.g., like contacts 2.1 or 2.2) which momentarily disconnects the circuit. Because of this momentary disconnection, arcing can occur due to the motor inductance. When the switch SW opens (power disconnected to the motor), an arc can also occur due to the motor inductance. (For the purpose of this discussion, contacts 2.1 or 2.2 are understood to be stationary, and contacts 2.3; or 2.4 are understood to be moving, but the contact functionality and designations could be reversed to achieve the desired switching functionality.)

By way of example, in FIG. 1 the snubber SN is applied or arranged in relation to a single phase AC motor M in a single phase implementation.

FIGS. 2A through 2C: Examples of Snubbers

By way of example, FIG. 2A through 2C show various snubbers or snubber circuits according to some embodiments of the present invention, e.g., having components and combinations of components as shown. FIGS. 2A through 2C show three different snubbers, including:

FIG. 2A, which shows an RC (resistor/capacitor) network;

FIG. 2B, which shows an MOV (metal oxide varistor); and

FIG. 2C, which shows a TVS (transient voltage suppressor) Diode.

In summary, the snubbers or snubber circuits shown in FIGS. 2A, 2B and 2C according to the present invention use a single circuit having either a linear circuit combination or a single non-linear device.

For example, the RC snubber in FIG. 2A uses an RC series combination, where the resistor R and capacitor C are both linear electrical components, and where the RC series combination is arranged in parallel across the motor M.

Further, the MOV snubber in FIG. 2B uses a single circuit having a single varistor that is arranged in parallel across the motor M.

Furthermore, the TVS (transient-voltage suppression) snubber in FIG. 2C uses a single circuit having a single bidirectional TVS diode that is arranged in parallel across the motor M.

By way of example, the snubber circuits in FIGS. 2A, 2B and 2C are shown in particular applications in relation to AC motors. None of these snubber circuits are implemented using two subcircuits arranged in series, each subcircuit having at least one respective non-linear electrical device (e.g., a diode); and none of these snubber circuits are implemented using two non-linear device (e.g., two diodes) in a series combination.

FIG. 2A shows apparatus 20 that includes a motor control circuit generally indicated as 21 for connecting or disconnecting an AC voltage Vac 1 to an AC motor 3 using a switch SW 2, which is shown as a double pole single throw switch 2 having power side poles or contacts 2.1, 2.2 as power poles 1 and 2, and having motor side poles or contacts 2.3, 2.4 as motor poles 1 and 2. The switch SW 2 is configured to respond to a process variable P and move between at least one open and closed switch contact position to connect or disconnect the AC voltage Vac 1 to the AC motor 3. In FIG. 2A, the SW 2 is shown in the open position. The motor control circuit 21 includes a snubber circuit 4 that is arranged across the motor side poles or contacts 2.3 and 2.4 in parallel with the AC motor 3, and configured to respond to motor inductance when the switch SW 2 is moved between the open and closed switch contact positions, and provide arc suppression in the switch SW 2 by dissipating energy stored in the motor inductance. (In FIG. 2A, the motor control circuit 21 also has the power side pole or contacts 2.1 and 2.1 coupled in parallel with the AC voltage Vac 1.) In FIG. 2A, the snubber circuit 4 includes an RC combination having a resistor 4.1 connected in series with a capacitor 4.2, which are both non-linear electrical device.

FIG. 2B shows apparatus 30 that includes a motor control circuit 31 for connecting or disconnecting the AC voltage Vac 1 to the AC motor 3 using the switch SW 2, which is shown as the double pole single throw switch 2 having the power side poles 2.1, 2.2 as the power poles 1 and 2, and having the motor side poles or contacts 2.3, 2.4 as the motor poles 1 and 2. In FIGS. 2A and 2B, similar components are labeled with similar reference numerals. In FIG. 2B, the snubber circuit 4 includes a MOV 4.3 connected in parallel across the AC motor 3.

In FIG. 2C, the apparatus 40 includes a motor control circuit 41 for connecting or disconnecting the AC voltage 1 to the AC motor 3 using the switch SW 2, which is shown as the double pole single throw switch 2 having the power side poles or contacts 2.1, 2.2 as the power poles 1 and 2, and having the motor side poles or contacts 2.3, 2.4 as the motor poles 1 and 2. In FIGS. 2A, 2B and 2C, similar components are labeled with similar reference numerals. In FIG. 2C, the snubber circuit 4 includes a TVS 4.4 connected in parallel across the AC motor 3.

FIG. 3: A 3-Phase Motor Implementation

In an alternative embodiment to the snubber applied in a single phase implementation in FIG. 1, FIG. 3 shows an embodiment that includes a 3-phase motor implementation/applications with a respective snubber on each phase. In effect, the difference is that there is a separate snubber placed or configured across each phase of the three phases of the motor M. The power source can be configured using any WYE configuration/connection, e.g., as shown in FIG. 3, as well as using a delta configuration/connection.

By way of example, the apparatus 50 may include a motor control circuit 51, which may be configured as follows:

The motor M may include, or take the form of, a 3-phase AC motor.

The switch SW may include three switch poles or contacts 2.1, 2.2, 2.3, 2.4, 2.5, 2.6, configured to respond to the process variable P and move between three open and closed switch contact positions to connect or disconnect three AC voltages Vac1, Vac2, Vac3 to the 3-phase AC motor. (Similar to that described above, the SW may include, or take the form of, a triple pole single throw switch having the power side poles or contacts 2.1, 2.2, 2.3 as the power poles 1, 2 and 3, and having the motor side poles 2.4, 2.5. 2.6 as the motor poles 1, 2 and 3.)

The snubber circuit may include three snubbers SN1, SN2, SN3, each snubber arranged across a respective pair of switch poles or contacts 2.4, 2.5; 2.4, 2.6; and 2.5, 2.6 in parallel with the motor M in a respective one of the 3-phases (e.g., having a 1st phase connection, a 2nd phase connection and a 3rd phase connection), and configured to respond to motor inductance when the switch is moved between the three open and closed switch contact positions, and provide arc suppression in the switch by dissipating energy stored in the motor inductance.

Figure 4:
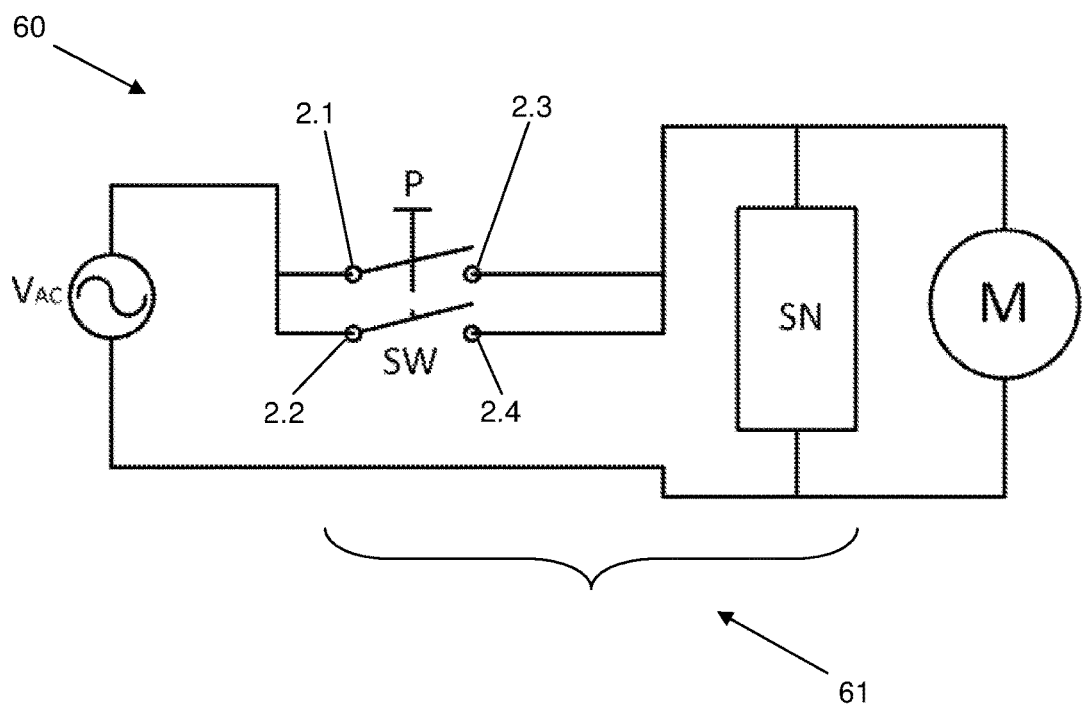
FIG. 4 shows a diagram of a circuit for controlling the operation of a motor, according to some embodiments of the present invention.

FIG. 4: Parallel Switch Contacts

Further, FIG. 4 shows an alternative embodiment in the form of apparatus generally indicated as 60 having a motor control circuit 61 having parallel switch poles or contacts 2.1, 2.2, 2.3 and 2.4, e.g., configured in series with the AC voltage Vac and the motor M. In effect, FIG. 4 shows that another method or technique to further increase the life of the switch SW is to configure the switch poles or contacts 2.1, 2.2, 2.3 and 2.4 in parallel, and use a snubber SN to protect the switch SW due from damage due to arcing when opening and closing.

Linear Vs. Non-Linear Devices

As a person skilled in the art would appreciate, a linear electrical device may include, or take the form of, a resistor, a capacitor or an inductor, which are understood to have a linear relationship between current and voltage, e.g., including where V=IR. In contrast, a non-linear electrical device (e.g., like a diode) is understood to be a device that does not have a linear relationship between current and voltage, e.g., including a non-linear relationship such as $I=I_o e^{(V/VT)}$.

Other Embodiments

Embodiments are also envisioned, and the scope of the invention is intended to include, e.g., using the motor control circuit according to the present invention for connecting or disconnecting either a DC voltage to a DC motor, or a DC voltage to an AC motor, or an AC voltage to a DC motor, e.g., in conjunction with using suitable AC-to-DC converters or DC-to-AC converters, as needed.

Applications

Applications for the present invention are broadly understood to include:

By way of example, possible applications of the present invention may include the following:
Pumps,
Fans,
Blowers,
Compressors, and
Conveyors.

THE SCOPE OF THE INVENTION

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:
1. A motor control circuit for connecting or disconnecting a voltage source to a motor having motor windings, comprising:

a multi-pole single throw switch having power side poles and motor side poles, the power side poles being coupled to the voltage source, and the motor side poles being coupled to the motor windings of the motor, the multi-pole single throw switch being configured to respond to a process variable and move between open and closed multi-pole switch contact positions to connect or disconnect the voltage source to the motor; and a snubber circuit connected across the motor windings of the motor and connected across the motor side poles of the multi-pole single throw switch and arranged in parallel with the voltage source when the multi-pole single throw switch is moved from an open to a closed multi-pole switch contact position, and configured to respond to motor inductance when the multi-pole single throw switch is moved between the open and closed multi-pole switch contact positions, and provide a discharge path for energy that produces an arc across the multi-pole single throw switch by dissipating energy stored in the motor inductance.

2. A motor control circuit according to claim 1, wherein the snubber circuit comprises a network having a resistor connected in series with a capacitor.

3. A motor control circuit according to claim 1, wherein the snubber circuit comprises a network having a metal oxide varistor.

4. A motor control circuit according to claim 1, wherein the snubber circuit comprises a network having a transient voltage suppressor.

5. A motor control circuit according to claim 1, wherein the multi-pole single throw switch comprises a double pole single throw switch having two power side poles coupled to the voltage source, and having two motor side poles coupled to the motor, the double pole single throw switch configured to respond to the process variable and move between two open and closed multi-pole switch contact positions to connect or disconnect the voltage source to the motor.

6. A motor control circuit according to claim 1, wherein the motor control circuit is for connecting or disconnecting an AC voltage to an AC motor.

7. A motor control circuit according to claim 1, wherein the motor is a 3-phase AC motor;
the multi-pole single throw switch comprises a triple pole single throw switch having three power side poles and three motor side poles, respective power side poles being coupled respective AC voltage sources, respective motor side poles being coupled to respective phase connections of the 3-phase AC motor, the triple pole single throw switch being configured to respond to the process variable and move between three open and closed triple pole switch contact positions to connect or disconnect the respective AC voltage sources to the 3-phase AC motor; and
the snubber circuit comprises three snubbers, each snubber connected across the motor windings of the motor and arranged in parallel with a respective AC voltage source, and configured to respond to motor inductance when the triple pole single throw switch is moved between the three open and closed triple pole switch contact positions, and provide a discharge path for energy that produces an arc across the three pole single throw switch by dissipating energy stored in the motor inductance.

8. A motor control circuit according to claim 1, wherein the motor forms part of a pump, fan, blower or compressor.

9. A motor control circuit according to claim 1, wherein the power side poles are couples in parallel to one voltage terminal of the voltage source, and the voltage source has another voltage source terminal couple to a motor terminal.

10. A motor control circuit according to claim 1, wherein the power side poles are coupled in parallel to one voltage terminal of the voltage source.

11. A motor control circuit according to claim 10, wherein the motor control circuit forms part of apparatus that includes the voltage source and the motor, and another voltage source terminal of the voltage source is coupled directly to a motor terminal of the motor.

12. A motor control circuit according to claim 1, wherein the motor side poles are coupled in parallel to one motor terminal of the motor.

13. A motor control circuit according to claim 12, wherein the motor control circuit forms part of apparatus that includes the voltage source and the motor, and another motor terminal of the motor is coupled directly to a voltage terminal of the voltage source.

14. A motor control circuit according to claim 1, wherein the power side poles are coupled in parallel to one voltage terminal of the voltage source; and the motor side poles are coupled in parallel to one motor terminal of the motor.

15. A motor control circuit according to claim 14, wherein the motor control circuit forms part of apparatus that includes the voltage source and the motor, and another motor terminal of the motor is coupled directly to another voltage terminal of the voltage source.

16. Apparatus, including a pump, fan, blower, compressor or conveyor, comprising:
a motor control circuit for connecting or disconnecting a voltage source to a motor having motor windings, having
a multi-pole single throw switch having power side poles and motor side poles, the power side poles being coupled to the voltage source, and the motor side poles being coupled to the motor windings of the motor, the multi-pole single throw switch being configured to respond to a process variable and switch between open and closed multi-pole switch contact positions to connect or disconnect the voltage source to the motor; and
a snubber circuit connected across the motor windings of the motor and connected across the motor side poles of the multi-pole single throw switch and arranged in parallel with the voltage source when the multi-pole single throw switch is moved from an open to a closed multi-pole switch contact position, and configured to respond to motor inductance when the multi-pole single throw switch is switched between the open and closed multi-pole switch contact positions, and provide a discharge path for energy that produces an arc across the multi-pole single throw switch by dissipating energy stored in the motor inductance.

17. Apparatus, according to claim 16, wherein the snubber circuit comprises a network having a resistor connected in series with a capacitor.

18. Apparatus, according to claim 16, wherein the snubber circuit comprises a network having a metal oxide varistor.

19. Apparatus, according to claim 16, wherein the snubber circuit comprises a network having a transient voltage suppressor.

20. A motor control circuit for connecting or disconnecting an AC voltage source to an AC motor having motor windings, comprising:
a multi-pole single throw switch having power side poles and motor side poles, the power side poles being coupled to the AC voltage source, and the motor side poles being coupled to the motor windings of the AC motor, the multi-pole single throw switch being configured to respond to a process variable and move between open and closed multi-pole switch contact positions to connect or disconnect the AC voltage source to the AC motor; and a snubber circuit connected across the motor side poles of the multi-pole single throw switch and the motor windings of the AC motor and arranged in parallel with the AC voltage source when the multi-pole single throw switch is moved from an open to a closed multi-pole switch contact position, and configured to respond to AC motor inductance when the multi-pole single throw switch is moved between the open and closed multi-pole switch contact positions, and provide a discharge path for energy that produces an arc across the multi-pole single throw switch by dissipating energy stored in the AC motor inductance.

21. A motor control circuit according to claim 20, wherein the snubber circuit comprises a network having a resistor connected in series with a capacitor.

22. A motor control circuit according to claim 20, wherein the snubber circuit comprises a network having a metal oxide varistor.

23. A motor control circuit according to claim 20, wherein the snubber circuit comprises a network having a transient voltage suppressor.

24. A motor control circuit according to claim 20, wherein the multi-pole single throw switch comprises a double pole single throw switch having two power side poles coupled to the AC voltage source, and having two motor side poles coupled to the AC motor, the double pole single throw switch configured to respond to the process variable and move between two open and closed multi-pole switch contact positions to connect or disconnect the AC voltage source to the AC motor.

25. A motor control circuit according to claim 20, wherein
the AC motor is a 3-phase AC motor;
the multi-pole single throw switch comprises a triple pole single throw switch having three power side poles and three motor side poles, respective power side poles being coupled respective AC voltage sources, respective motor side poles being coupled to respective phase connections of the 3-phase AC motor, the triple pole single throw switch being configured to respond to the process variable and move between three open and closed triple pole switch contact positions to connect or disconnect the respective AC voltage sources to the 3-phase AC motor; and
the snubber circuit comprises three snubbers, each snubber connected across the motor windings of the motor and arranged in parallel with a respective AC voltage source, and configured to respond to motor inductance when the triple pole single throw switch is moved between the three open and closed triple pole switch contact positions, and provide a discharge path for energy that produces an arc across the three pole single throw switch by dissipating energy stored in the motor inductance.

26. A motor control circuit according to claim 20, wherein the AC motor forms part of a pump, fan, blower or compressor.

* * * * *